Dec. 23, 1958  G. K. C. HARDESTY  2,866,186
MECHANICAL INDICATOR FOR ANNUNCIATORS
Filed Dec. 27, 1954  2 Sheets-Sheet 1

INVENTOR
GEORGE K. C. HARDESTY

BY *George Sipkin*
*B. L. Zangwill*
ATTORNEYS

Dec. 23, 1958    G. K. C. HARDESTY    2,866,186
MECHANICAL INDICATOR FOR ANNUNCIATORS
Filed Dec. 27, 1954    2 Sheets-Sheet 2
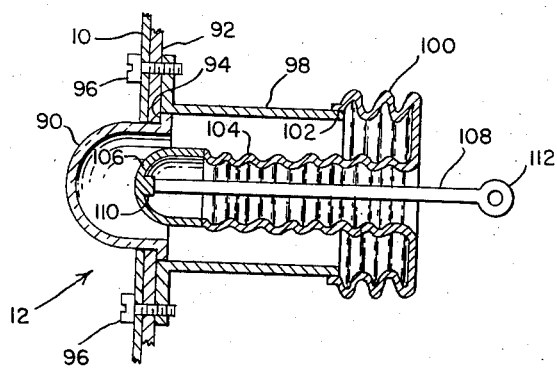
FIG. 3.
FIG. 4.
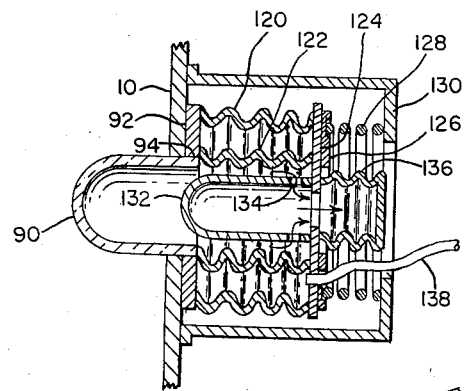
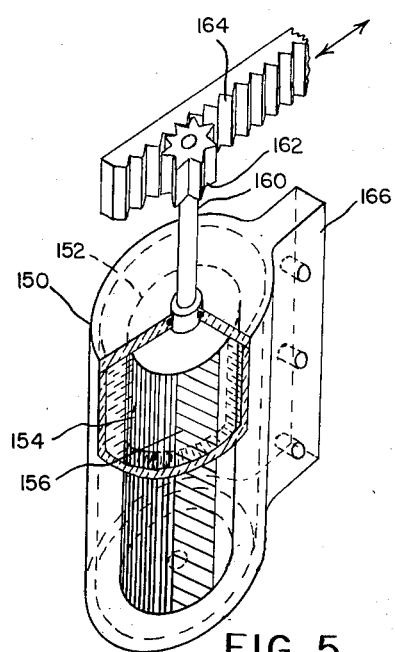
FIG. 5.
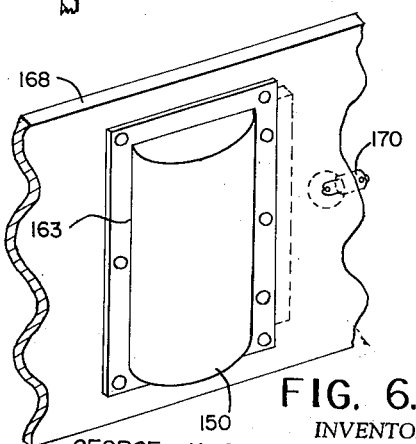
FIG. 6.
INVENTOR
GEORGE K. C. HARDESTY
BY George Sipkin
B. L. Zangwill
ATTORNEYS

United States Patent Office

2,866,186
Patented Dec. 23, 1958

2,866,186
MECHANICAL INDICATOR FOR ANNUNCIATORS

George K. C. Hardesty, Mayo, Md.

Application December 27, 1954, Serial No. 477,957

18 Claims. (Cl. 340—366)

(Granted under Title 35, U. S. Code (1952), sec. 266)

The invention described herein may be manufactured and used by or for the Government of the United States of America for governmental purposes without the payment of any royalties thereon or therefor.

The present invention relates to an indicating device and more particularly to an indicator or signal for use with an annunciator or similar equipment wherein the contrast between no-signal and signaling conditions must be very prominent and must command attention to a degree unusual in mechanical annunciators.

The present invention eliminates the disadvantages inherent in prior art signalling devices by providing a mechanical or electro-mechanical type having a novel optical operation. The invention further discloses the use of an entirely mechanical type of indicator which is made operative by positive action of a mechanically actuated part for controlling the novel optical display.

Accordingly, it is an object of the present invention to provide an indicator wherein a positive and enhanced signal is presented without resorting to the use of electric lamps or audible alarms.

Another object of the invention is the provision of an annunciator signal having an actuator for controlling an optical enhancement of the signal.

A further object of the invention is the provision of a liquid within a sealed assembly for imparting amplifying or enhancing action to a target member used as part of the annunciator signal.

Still another object of the invention is the provision of an indicator of a type described for showing the condition of operativeness of equipment.

With these and other objects in view as will hereinafter more fully appear, and which will be more particularly pointed out in the appended claims, reference is now made to the following description taken in connection with the accompanying drawings in which:

Fig. 3 is a cross-sectional view in elevation of a mechanical indicator in accordance with the invention, of a type adapted for actuation by a remotely disposed power source;

Fig. 4 is a cross-sectional view in elevation of a mechanical indicator in accordance with the invention utilized for showing the existence of pressure in a system;

Fig. 5 is a perspective view partly in section showing a rotatably mounted indicator in accordance with the invention, the indicator having a target in a barrel, adapted for actuation by a rack and pinion gear; and Fig. 6 is a front view, partly in section, of the indicator of Fig. 5 mounted on a panel.

Figure 1:
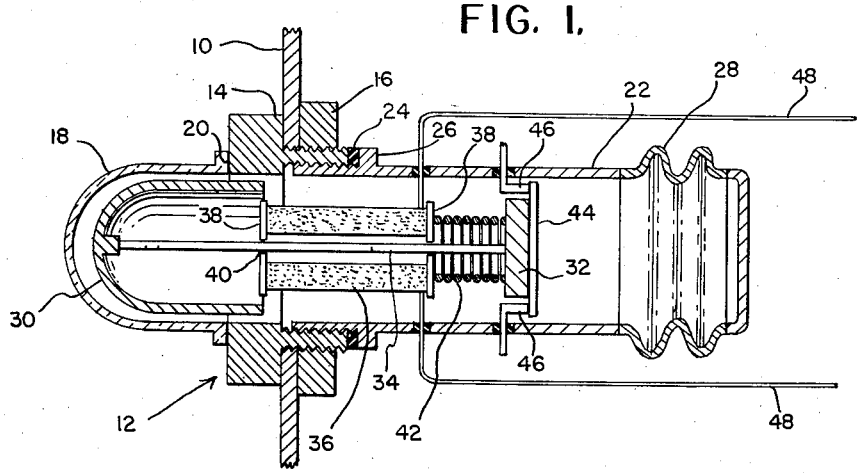
Fig. 1 is a cross-sectional view in elevation of an electro-mechanical type of indicator, embodying principles of the invention.

Referring now to the drawings, wherein like reference characters designate like or corresponding parts throughout the several views, there is shown in Fig. 1 a panel 10 having a central panel opening for receiving an annunciator, indicator, or signal in the form of a hermetically sealed receptacle indicated in its entirety by the reference numeral 12. The receptacle 12 comprises a bushing 14, a lens 18, and a housing 22. The flanged bushing 14, having both internal and external threads, is affixed within the panel opening and is secured thereto by means of a lock nut 16. The transparent hollow lens member 18, positioned on the outer side of the panel, is secured to the bushing 14 at 20 by means of a glass to metal seal. The lens member 18 has a semi-spherical end so that it has a concave curvature. Cylindrical housing 22 projects behind the panel and is provided with a threaded open end which engages the inner threads of bushing 14 for rigidly affixing the housing to the panel wall. A gasket 24 is held in place by a flange 26 on the housing and provides a fluid-tight engagement with the bushing. Attached to the back end of housing 22, as by screw threads or welding, is a bellows 28 whose function is described hereinafter.

The hermetically sealed tube or receptacle 12 is filled preferably with a synthetic liquid such as silicone, or other liquids which are available in a wide range of indices of refraction. Mounted within the tube 12 is a hollow target member or shell 30, painted red for example and shown in Fig. 1 in an indicating position, inside the lens member 18. The target member is movable into and out of this position. The liquid chosen should preferably be clear or colorless and have an optical index of refraction corresponding to that of the glass or plastic of the lens 18. The target 30 is connected with a circular ferrous block or armature 32 by means of a connecting rod 34 extending longitudinally of a fixed solenoid coil 36. Plates 38 positioned on each end of the coil are equipped with small apertures 40 in the center thereof for providing a bearing surface for rod 34 as it reciprocates longitudinally. A spring 42, encircling connecting rod 34, is positioned between plate 38 of the solenoid coil 36 and metal block 32 for biasing the target member 30 to a non-indicating position inside the housing 22 and around solenoid 36. Positioned within the housing 22 and insulatedly secured to the armature 32 is contact plate 44 which cooperates with fixed contacts 46 included in a circuit exterior of the housing 22 for controlling an audible alarm or similar signalling device.

The operation of the device is as follows:

When the solenoid coil 36 is energized through conductors 48, the flux pattern set up by the coil draws armature 32 to the left of Figure 1, carrying with it the target member 30. As the target member commences moving, the liquid within the hermetically sealed tube 12 offers a resistance to the movement of the target member so as to eliminate vibrations and sudden shock which would otherwise be imposed on the device. When the target member is positioned relatively close to lens member 18 in an indicating position, as for example when the spring 42 is fully compressed as shown in Fig. 1, the liquid remaining in the tube between the target 30 and lens 18 creates the illusion of increased size of target or signal. The entire volume of the lens 18 looks red, or whatever other color is used for the target 30. The compressed spring acts as a stop positioning the target 30 in indicating position spaced from the lens 18.

An important feature of this invention lies in the greatly enhanced visibility or prominence of the indicating element in indicating or signalling position. This is the result of various optical phenomena which operate to create an illusion that the surface of the transparent enclosure or lens 18 has changed color from a transparent body to, for example, a bright red body of the color of the target 30. The indicating element is magnified in size through the lens-like properties of the filled enclosure or lens 18 while the absence of optically-significant intervening interfaces between the lens and the target results from the optical properties of the liquid filling in the lens. The evenly-colored target seems to lose its identity, and the visible lens seems to be filled with a color similar to that of the target. For practicable application, the diameter of the target should be at least one-half to two-thirds the diameter of the lens, and in the indicating position the clearance between them may approximate one-sixteenth inch, more or less, for an indicator of approximately three-fourths inch outside diameter.

Upon deenergization of the circuit to coil 34 spring 42 urges the armature 32 to the right thereby moving target member 30 away from transparent lens member 18 and simultaneously opening the relay contacts 44 and 46 so that the external remote signal changes accordingly. In this non-signalling position, the target 30 is withdrawn in the tube 12; and the signal observed at lens 18 is unmagnified and its color is that obtained from the colorless glass and liquid.

Figure 2:
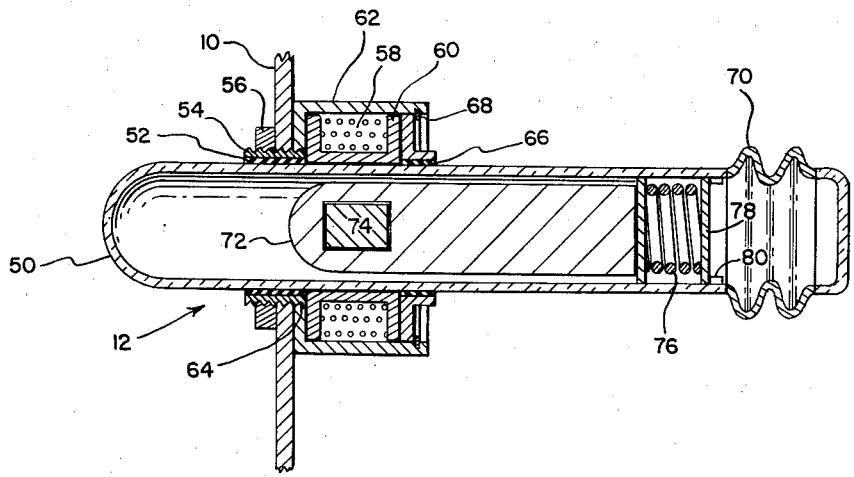
Fig. 2 is a cross-sectional view in elevation of a modified form of electro-mechanical type indicator, embodying principles of the invention.

The modification of Fig. 2 shows a solenoid coil mounted exteriorly of the hermetically sealed tube 12. This structure simplifies the construction and permits replacement of the rest of the assembly without disturbing the electrical system. Referring more specifically to Fig. 2, a transparent tube 50 is resiliently mounted in panel 10 by a rubber gasket 52. The tube 50 has a transparent concavely-curved end mounted to be visible for signalling purposes similar to the lens 18. Encompassing the gasket 52 and in threaded engagement with panel 10 is a spacer member 54 held in place by a lock nut 56. A solenoid coil 58 surrounds the part of tube 50 behind panel 10, the coil being wrapped on a spool 60. For holding the spool and coil in place, a housing 62, threadably attached to spacer 54 at 64, encompasses the solenoid coil and is provided with a circular disc which is spaced from the tube 50 by a rubber gasket 66 and held in rigid relationship with housing 62 by a snap ring 68. The tube is filled with any suitable liquid of proper optical index of refraction. A bellows arrangement 70 on the back end of the tube allows for expansion and contraction of the liquid. The target member 72 is of slightly less diameter than tube 50 and has a magnetic slug 74 positioned within its interior for moving the target member 72 in response to the field established by the solenoid coil 58 when it is energized. A spring 76 is biased between the back end of movable target member 72 and a plate 78 pressed against a stop member 80.

For operation, as shown in Fig. 2, the solenoid winding is energized for removing the display caused by target 72. The magnetic field set up by the winding flows through the magnetic slug 74 thereby moving the target member 72 to the right against the action of spring 76 to a nonindicating position. Upon loss of power to the equipment, and therefore to the solenoid coil, spring 76 acts against the target member 72 moving it to the left or to indicating position adjacent the lens of the tube. When the target member is in this position, it is readily detected since the liquid in the tube produces a magnified appearance of the colored end of the target. In other words, as in Fig. 1, the embodiment of Fig. 2 in signalling position produces both a change in color and the illusion of an enlarged mass.

The embodiments of Figures 3, 4, and 5 are basically the same in magnifying effect as the electrical solenoid actuated type of annunciator described above. These figures show a mechanically actuated assembly embodying the same principle of using a colored plunger in a liquid-filled lens, which functions as a magnifying lens to produce a unique magnification of the colored plunger making it readily visible from a distance.

Referring now to Fig. 3, there is shown a hermetically sealed assembly 12 comprising a transparent lens or curved window 90 affixed to a metal plate 92 by a glass to metal seal 94. The metal plate 92 is affixed to panel 10 by means of a plurality of screws 96 which hold the lens in fixed relationship with the panel. Cylindrical tube 98 is attached at one end to plate 92 by screws 96 and has a bellows 100 welded to its other end 102. Connected to and positioned internally of bellows 100 is a second bellows 104 which terminates in a colored target 106 adapted for movement to and from a position adjacent transparent lens 90. Longitudinal movement of the target is achieved by a bar 108 connected at one end to the target member at 110 and is provided with a connector 112 at its other end which is adapted for connection to a movable member for reciprocating the target member longitudinally of tube 98. The forced displacement of liquid within tube 98 when target member 106 is moved into an indicating position is volumetrically compensated for by bellows 100.

Referring now to Figure 4, the transparent lens 90 is attached to metal plate 92 by a glass to metal seal 94 and affixed to panel 10 as in the previous modification. In this embodiment of the invention, the target member is adapted to signal a dangerous condition when the pressure in an oil or pneumatic control line, for example, fails or falls below a critical or predetermined pressure. The structure comprises a pair of bellows 120 and 122 respectively connected at one end to plate 92 and at the other end to a ring-shaped diaphragm 124. A washer 126 is attached to the back side of diaphragm 124 and is provided with a groove for receiving an end of spring 128 which is biased between the washer and housing 130 for the unit. Target member 132 is likewise affixed to the diaphragm and has openings 134 in the base thereof for passing fluid to and from a third bellows 136 attached to the back side of the diaphragm. An oil, air or water connection 138, or the like, is connected to the space between bellows 120 and 122 and a predetermined pressure from such fluid forces the diaphragm 124 to the right thereby drawing target member 132 into a nonindicating position. When the pressure within the pair of main bellows is relieved for one reason or another, the force of spring 128 overcomes the pressure remaining and urges the target member into an indicating position adjacent transparent lens 90 producing an optically enlarged indication. The target member will stay in this position until pressure is reapplied to the bellows for moving diaphragm 124 to the right and the target into a non-indicating position.

In the embodiment of Figs. 5 and 6, the transparent lens presented to the observer is cylindrical, rather than the spherical type described in the previous species of the invention, and the magnification is permanent, the change in signal arising from a plurality of different colors which are painted on the target member which moves about an axis common to the cylindrical lens.

Referring more specifically to Fig. 5, the assembly shown consists of a cylindrical transparent housing member 150 having a hollowed out portion for receiving a target indicating member 152. The cylindrical housing 150 is filled with a transparent liquid, preferably of an optical index approximating that of the transparent member 150. Target member 152 is provided with a red surface 154 and a green surface 156, each of which covers approximately one-half of the cylindrical surface of the element. The viewing area of the cylindrical housing 150 is of such width that only a single painted surface can be seen at one time. The target 152 is mounted on a supporting shaft 160 having a pinion gear 162 attached to the end thereof. Gear 162 is caused to turn by a rack 164 which reciprocates in a direction transverse to the exis of the assembly in response to variations of a variable. The cylindrical housing member 150 is provided with a flange-like portion 166 by means of which it can be secured to a panel 168 with a part only of the housing member 150 passing through a hole in the panel 168, the operating mechanism comprising shaft 160 being at the back of the panel. A lamp 170 is also behind the panel and provides indirect lighting of the complete indicator. On the outside, the color showing will correspond to that of the half surface facing outwardly of the panel.

In operation, the indicating element 152 is displaced angularly in increments of one-half revolution for a two-color target member. Obviously, the number of colors can be changed and the construction and control modified accordingly. Each increment exposes a different-colored area to the observer as viewed by him through the lens system. The enhanced appearance, superior legibility, wider viewing angle, and freedom from distracting glare, attributed to the plunger types of the previously described modifications, are also features of this cylindrical structure. As a result of the cylindrical shape of the lens member 150, the viewing angle is distributed. This would not be restrictive in most applications. For example, all indicators mounted on a power plant type switchboard would be readily visible to the observer from any position he might occupy while monitoring a switchboard.

Obviously many modifications and variations of the present invention are possible in the light of the above teachings. It is therefore to be understood that within the scope of the appended claims the invention may be practiced otherwise than as specifically described.

What is claimed is:

1. A mechanical indicator for an annunciator comprising, a sealed receptacle adapted for mounting in a panel of said annunciator, said receptacle comprising a curved hollow transparent viewing envelope, a cylindrical member, spacer means interconnecting said envelope with said cylindrical member, an electromagnetic means in said cylindrical member for moving an armature associated therewith, colored target means in said receptacle connected with said armature, means biasing said target member to a non-indicating position away from said viewing envelope, said armature moving said target to indicating position inside said viewing envelope upon actuation of said electromagnetic means against said biasing means, and a liquid in said receptacle having an optical index of refraction substantially corresponding to that of said envelope, a portion of said liquid being between said target and said envelope in indicating position of the target and providing therewith an enhancing optical action for emphasizing the size of said target member when the latter is in an indicating position.

2. A mechanical indicator for an annunciator comprising, a receptacle having a sealed transparent face, a colored target member in said receptacle adapted for movement in said receptacle to and from an indicating position, an electromagnet having an armature, means connecting said armature with said target member, spring means in said receptacle urging said target member to a first of said positions, a liquid in said receptacle having an index of refraction substantially corresponding to that of said face, a part of said liquid being between said face and said target when the latter is in an indicating position, said liquid substantially filling any otherwise unoccupied space in said sealed receptacle, and expansion means on said receptacle but spaced from said indicating position for compensating for changes in the density of said liquid.

3. A mechanical indicator for an annunciator comprising, a receptacle having a transparent face, a colored target member in said receptacle, a liquid in said receptacle having an index of refraction substantially corresponding to that of said face for emphasizing the color of said target member when the latter is positioned adjacent said transparent face, an electrical coil mounted on said receptacle, said target member comprising a magnetic slug positioned to be responsive to a magnetic field, established when said coil is energized and biasing means for said target member, said receptacle comprising mounting means mounting said target member with its slug in a position to be attracted by the magnet field established when said coil is energized, whereby said coil and biasing means cooperate for moving said target member into and from a position adjacent said transparent face.

4. A mechanical indicator for an annunciator comprising a transparent tube having a semi-spherical end and adapted for attachment to a panel of said annunciator, expansion means interconnecting said tube with a movable plate and forming a chamber therein, a target member in said chamber connected with said plate and being adapted for movement into an indicating position adjacent a face of said tube upon a change in said expansion means, a first fluid in said chamber surrounding said target member, a second fluid in said expansion means for moving said plate and attached target member away from said tube, biasing means on said plate acting against said expansion means, and volumetric expansion means associated with said chamber for receiving said first fluid from said chamber when said target member is moved to an indicating position.

5. The combination according to claim 4 wherein said expansion means comprises a pair of spaced bellows for forming said chamber therebetween, and said volumetric expansion means is mounted on a side of said plate opposite from said spaced bellows.

6. A mechanical indicator comprising a cylindrical member and a viewing face, said member having a liquid therein of substantially the same index of refraction of said face, a cylindrical target member spaced from the first said cylindrical member and provided with a plurality of differently colored indications on the surface thereof movably mounted in the first said member and immersed in said liquid, and movable means connected with said target member for selectively moving the target member to place a first of said indications in an indicating position adjacent said face, whereby the fluid in the first said member produces a magnification of the last said indication.

7. A mechanical indicator comprising a transparent lens member adapted for mounting on a panel of said annunciator, a target member provided with indicating means thereon, means movably mounting target member, operating means for moving said target member to place its indicating means adjacent to or removed from said lens member, a liquid in said lens member, said liquid having an optical index of refraction which is substantially the same as that of said lens member for magnifying the indication of said indicating means when it is moved into an indicating position adjacent said lens member, said liquid substantially filling any otherwise unoccupied space in said lens member, and expansion means for said liquid.

8. An annunciator of a type described comprising a container having clear, signal-providing portion and a second portion, means for mounting said container on a signal panel with said clear portion visible, a signal comprising a colored indicating means movable in said container between a first position in said clear portion and a second position, in said second portion, means for selectively moving said indicating means from one of said positions to the other, a clear liquid in said container, a magnifying lens system being provided in said first position of said indicating means, said lens system comprising said indicating means, said clear portion and said clear liquid, with said indicating means and clear portion providing a space therebetween filled with said liquid in said lens system, thereby providing a magnified signalling indication, said indicating means in said second position being relatively further spaced from said clear portion thereby providing a much longer space therebetween as compared to said space.

9. An annunciator as defined in claim 8 but further characterized by said clear portion being concave outward, and said indicating means comprising a target of a size to nest within said portion.

10. An annunciator as defined in claim 9 but further characterized by said portion and liquid having substantially corresponding indices of refraction.

11. An annunciator of a type described comprising a container having a clear visible concave-outward portion and a second portion adjacent said clear portion, a colored target indicating means movable in said container between a first position adjacent but spaced from said clear portion and a second position in said second portion, a clear liquid in said container, said indicating means having a color different from that of said clear portion and liquid, and actuatable means for moving said indicating means between said positions, said liquid filling the space between said indicating means and said clear portion in said first position of said indicating means.

12. An annunciator as defined in claim 11, said actuatable means comprising an electromagnetic coil and an associated armature unitary with said indicating means.

13. An annunciator as defined in claim 11, said actuatable means comprising an actuating member connected to said indicating means and extending outside of said container.

14. An annunciator as defined in claim 11 but further characterized by said actuatable means comprising a bellows-type movable member forming a closure for said container, and means operable for moving said movable member.

15. An annunciator as defined in claim 11 but further characterized by said liquid having an optical index of refraction substantially corresponding to that of said clear portion.

16. An annunciator of a type described comprising a container having a clear visible concave-outward portion and a second portion adjacent to said clear portion, a colored target indicating means movable in said container between a first position adjacent but spaced from said clear portion and a second position in said second portion, a light-pervious liquid substantially filling any otherwise unoccupied space in said container, and actuatable means for moving said indicating means between said positions said liquid filling the space between said indicating means and said clear portion in said first position of said indicating means to thereby provide a magnifying effect, said container including a liquid-displacement means for absorbing the liquid volumetric changes therein.

17. An annunciator as defined in claim 16 but further characterized by said displacement means comprising a bellows.

18. An annunciator as defined in claim 16 but further characterized by said liquid having an optical index of refraction substantially corresponding to that of said clear portion.

References Cited in the file of this patent

UNITED STATES PATENTS

| | | |
|---|---|---|
| 841,307 | Blake | Jan. 15, 1907 |
| 1,464,894 | Webb | Aug. 14, 1923 |
| 2,056,715 | Dinsmore | Oct. 6, 1936 |
| 2,410,636 | Cress | Nov. 5, 1946 |
| 2,490,873 | Johnson | Dec. 13, 1949 |
| 2,592,329 | Picard | Apr. 8, 1952 |
| 2,644,939 | Ebel | July 7, 1953 |

FOREIGN PATENTS

| | | |
|---|---|---|
| 873,961 | Germany | Apr. 20, 1953 |